(12) United States Patent
Prasse et al.

(10) Patent No.: US 11,421,108 B2
(45) Date of Patent: Aug. 23, 2022

(54) CURABLE ORGANOPOLYSILOXANE COMPOSITIONS

(71) Applicant: WACKER CHEMIE AG, Munich (DE)

(72) Inventors: Marko Prasse, Glaubitz (DE); Detlev Ostendorf, Dresden (DE)

(73) Assignee: WACKER CHEMIE AG, Munich (DE)

( * ) Notice: Subject to any disclaimer, the term of this patent is extended or adjusted under 35 U.S.C. 154(b) by 31 days.

(21) Appl. No.: 16/646,845

(22) PCT Filed: Sep. 15, 2017

(86) PCT No.: PCT/EP2017/073343
§ 371 (c)(1),
(2) Date: Mar. 12, 2020

(87) PCT Pub. No.: WO2019/052660
PCT Pub. Date: Mar. 21, 2019

(65) Prior Publication Data
US 2020/0325337 A1   Oct. 15, 2020

(51) Int. Cl.
*C08L 83/06* (2006.01)
*C04B 30/02* (2006.01)
*C08J 5/24* (2006.01)

(52) U.S. Cl.
CPC ............ *C08L 83/06* (2013.01); *C04B 30/02* (2013.01); *C08J 5/24* (2013.01); *C08J 2383/07* (2013.01); *C08J 2433/10* (2013.01); *C08J 2433/14* (2013.01); *C08J 2435/02* (2013.01); *C08L 2312/00* (2013.01)

(58) Field of Classification Search
CPC ...... C08L 83/06; C08L 2312/00; C04B 30/02; C08J 5/24; C08J 2383/07; C08J 2433/10; C08J 2433/14
See application file for complete search history.

(56) References Cited

U.S. PATENT DOCUMENTS

| | | |
|---|---|---|
| 5,282,998 A | 2/1994 | Horn et al. |
| 8,039,539 B2 | 10/2011 | Pfeiffer et al. |
| 9,296,766 B2 | 3/2016 | Standke et al. |
| 9,828,392 B2 | 11/2017 | Standke et al. |
| 9,862,642 B2 | 1/2018 | Ostendorf et al. |

FOREIGN PATENT DOCUMENTS

| | | |
|---|---|---|
| CN | 101730669 A | 6/2010 |
| DE | 10059468 A1 | 11/2001 |
| DE | 102011007651 A1 | 9/2011 |
| DE | 102011086865 A1 | 5/2013 |
| DE | 102011086869 A1 | 5/2013 |
| EP | 0518057 B1 | 7/1998 |
| EP | 2692776 B1 | 2/2017 |
| JP | 2013129766 A | 7/2013 |
| JP | 2013163789 A | 8/2013 |
| WO | 2015028296 A1 | 3/2015 |

OTHER PUBLICATIONS

DE 10 2011 007651 machine translation (Year: 2011).*
Silicone Resin, Wikipedia (Year: 2021).*
Article: P. Rosciswewski et al., Polymery Journal, 2016, vol. 62, 1, p. 3-9, English Abstract.
P. Rosciszewski et al., Neue Reaktive Silikonharze, Polimery Journal, vol. 61, No. 1, 2016, pp. 3-9, Publisher: Lukasiewicz Research Network—Industrial Chemistry Institute, Warsaw, Poland.

* cited by examiner

*Primary Examiner* — Edward J Cain
(74) *Attorney, Agent, or Firm* — Brooks Kushman P.C.

(57) ABSTRACT

Addition curable composition containing specific silicone resins containing aliphatically unsaturated groups and an organic compound containing unsaturated groups such as acrylate or methacrylate groups are suitable when used with fine and coarse fillers to produce artificial stone with both high hardness and high flexural strength.

19 Claims, No Drawings

CURABLE ORGANOPOLYSILOXANE COMPOSITIONS

CROSS REFERENCE TO RELATED APPLICATIONS

This application is the U.S. National Phase of PCT Appln. No. PCT/EP2017/073343 filed Sep. 15, 2017, the disclosure of which is incorporated in their entirety by reference herein.

BACKGROUND OF THE INVENTION

1. Field of the Invention

The present invention relates to curable organopolysiloxane compositions which comprise silicone resins having at least one aliphatic carbon-carbon multiple bond, and also compounds having aliphatic carbon-carbon double bonds, to production thereof, and to their use.

2. Description of the Related Art

Polyorganosiloxanes having aliphatic carbon-carbon double bonds and also their use are already known. EP-B1 518 057, for example, discloses the preparation of vinyl-functionalized catenary and cyclic organosiloxanes, consisting predominantly of $R_2SiO_{2/2}$ structural units, and the use thereof as crosslinking agents for polyolefins. Likewise known are polyorganosiloxanes having Si—C-bonded, methacrylate-containing substituents. EP-B1 2 692 776, for example, describes silicones having Si—C-bonded, methacrylate-containing substituents which consist substantially of linear and cyclic $R_2SiO_{2/2}$ structural units and which are prepared by a hydrosilylation reaction, a fact, however, which renders the method inconvenient and therefore very costly.

DE-A 102011086865, DE-A 102011086869 and US-A 9,296,766 describe vinyl-functionalized silicone resin intermediates which have a very low degree of condensation and also a high alkoxy content and are therefore not suitable for use as binders in composites. In Polimery 2016, 61, No. 1, moreover, reactive silicone resins having Si—C-bonded, methacrylate-containing substituents are described. These silicone resins, however, have a relatively low fraction of $RSiO_{3/2}$ units and a high fraction of dimethylsiloxy units.

A disadvantage of the above-described polyorganosiloxanes is that as binders in combination with reactive plasticizers, these being compounds which contain polymerizable carbon-carbon double bonds, they do not provide high flexural strengths in composite applications.

SUMMARY OF THE INVENTION

A subject of the invention are compositions comprising
(A) organopolysiloxane resins consisting of units of the general formula $$R_a R^1_b (OR^2)_c SiO_{(4-a-b-c)/2} \qquad (I)$$

where
R may be identical or different and represents hydrogen or monovalent, SiC-bonded, optionally substituted hydrocarbon radicals which are free from aliphatic carbon-carbon multiple bonds,
$R^1$ may be identical or different and denotes monovalent, SiC-bonded, optionally substituted hydrocarbon radicals which have aliphatic carbon-carbon multiple bonds,
$R^2$ may be identical or different and denotes hydrogen atom or monovalent, optionally substituted hydrocarbon radicals,
a is 0, 1, 2 or 3,
b is 0 or 1 and
c is 0, 1, 2 or 3,
with the proviso that in formula (I) the sum a+b+c≤3, in at least one unit of the formula (I) b=1, in at least 50%, preferably at least 60%, more preferably at least 80%, most preferably at least 90% of the units of the formula (I) a+b=1 and also in at most 10%, preferably at most 8%, more preferably at most 6% of the units of the formula (I) a+b=3, based in each case on all siloxane units of the formula (I) in organopolysiloxane resin (A),
(B) organic compounds having at least one unit of the formula $$CR^3_2 = CR^3 - CO - Z - \qquad (II),$$

where
$R^3$ may be identical or different and denotes hydrogen, the cyano radical —CN, or a monovalent, optionally substituted hydrocarbon radical which may be interrupted by heteroatoms, Z may be identical or different and denotes —O— or —$NR^5$— and $R^5$ may be identical or different and denotes hydrogen or a monovalent, optionally substituted hydrocarbon radical which may be interrupted by heteroatoms,
(C) initiators, and
(D) fillers.

DETAILED DESCRIPTION OF THE PREFERRED EMBODIMENTS

Examples of monovalent, SiC-bonded hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl and the 2,2,4-trimethylpentyl radical; nonyl radicals, such as the n-nonyl radical; decyl radicals such as the n-decyl radical; dodecyl radicals such as the n-dodecyl radical; hexadecyl radical such as the n-hexadecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, biphenylyl, naphthyl, anthryl and phenanthryl radicals; alkaryl radicals such as the o-, m-, p-tolyl radicals, xylyl radicals and ethylphenyl radicals; and aralkyl radicals such as the benzyl radical and the α- and the β-phenylethyl radicals.

Examples of monovalent, SiC-bonded, substituted hydrocarbon radicals R are 3-(O-methyl-N-carbamato)propyl, O-methyl-N-carbamatomethyl, N-morpholinomethyl, 3-glycidyloxypropyl, cyclohexylaminomethyl, phenylaminomethyl, isocyanatomethyl, 3-isocyanatopropyl, 3-aminopropyl, N-(2-aminoethyl)-3-aminopropyl, N-cyclohexyl-3-aminopropyl, succinic anhydride, 2-(3,4-epoxycyclohexyl)ethyl, N-(1,3-dimethylbutylidene)propyl, aminocarbonylamino, 3-mercaptopropyl, and 3-chlorpropyl radicals.

Radical R preferably comprises monovalent, SiC-bonded hydrocarbon radicals which have 1 to 18 carbon atoms and are free from aliphatic carbon-carbon multiple bonds, more preferably alkyl or aryl radicals having 1 to 8 carbon atoms, most particularly the methyl radical.

Examples of monovalent, SiC-bonded, optionally substituted radicals $R^1$ which have aliphatic carbon-carbon multiple bonds are vinyl, 1-propenyl, 2-propenyl, n-5-hexenyl, 2-(3-cyclohexenyl)ethyl, 7-octenyl, 10-undecenyl, 4-vinylcyclohexyl, 3-norbornenyl, 2-bornenyl, 4-vinylphenyl, methacryloyloxymethyl, acryloyloxymethyl, 3-methacryloyloxypropyl, 3-acryloyloxypropyl, and N-(vinylbenzyl)-2-aminoethyl-3-aminopropyl radicals.

Radical $R^1$ preferably comprises monovalent, SiC-bonded, optionally substituted hydrocarbon radicals which have aliphatic carbon-carbon double bonds and 1 to 18 carbon atoms, more preferably vinyl, methacryloyloxymethyl, acryloyloxymethyl, 3-methacryloyloxypropyl or 3-acryloyloxypropyl radicals, more preferably the vinyl or the 3-methacryloyloxypropyl radical, most preferably the vinyl radical.

The organopolysiloxane resins (A) of the invention may have only one radical $R^1$ or two or more different radicals $R^1$, in which case preferably the sum of the units of the formula (I) with $R^1$=vinyl is at least 80%, more preferably at least 90%, and most preferably at least 95%, based on all the units of the formula (I) with b=1.

Examples of radical $R^2$ are the radicals stated for radical R and $R^1$.

Radical $R^2$ preferably comprises hydrogen or monovalent hydrocarbon radicals having 1 to 18 carbon atoms, more preferably the methyl, ethyl, n-propyl, isopropyl, n-butyl, sec-butyl, tert-butyl or isobutyl radicals, most preferably hydrogen and the methyl or ethyl radical.

In the resin (A) used in the invention, the sum of the units of the formula (I) with b=1 is preferably 10% to 40%, more preferably 15% to 30%.

In the resin (A) used in the invention, the sum of the units of the formula (I) with a+b=2 is preferably at most 30%, more preferably at most 20%, yet more preferably at most 10%, and most preferably at most 5%, based in each case on the sum of all the siloxane units of the formula (I).

In the resin (A) used in the invention, the sum of the units of the formula (I) with c≠0 is preferably 5% to 60%, more preferably 10% to 55%, yet more preferably 20% to 50%, and most preferably 30% to 45%, based in each case on the sum of all the siloxane units of the formula (I).

The resins (A) used in the invention preferably consist of on average at least 12, more preferably on average at least 15, yet more preferably on average at least 18, and most preferably of on average 18 to 50 units of the formula (I).

The units of the formula (I) are preferably distributed statistically in organopolysiloxane resin (A).

Examples of organopolysiloxane resins (A) are compounds (A) which are obtainable by cohydrolysis of tetraethoxysilane, organyltriethoxysilanes, diorganyldiethoxysilanes and/or triorganylethoxysilanes with water and which have preferably on average at least 12, more preferably on average at least 15, and most preferably on average at least 18 silicon atoms per molecule. In place of the above-stated ethoxysilanes it is also possible to use the corresponding methoxysilanes for preparation, in which case organylmethoxypolysiloxanes are then obtainable. It is, however, also possible to use mixtures of ethoxy- and methoxysilanes, in which case organylmethoxyethoxypolysiloxane resins are then obtainable.

Preferred examples of such organopolysiloxane resins (A) used in the invention are $(MeSiO_{3/2})_{0.48}(ViSiO_{3/2})_{0.12}(Me(MeO)SiO_{2/2})_{0.26}(Vi(MeO)SiO_{2/2})_{0.07}(Me(HO)SiO_{2/2})_{0.02}(Me_2SiO_{2/2})_{0.01}(Me(MeO)_2SiO_{1/2})_{0.01}(Me_3SiO_{1/2})_{0.03}$ with a number-average molar mass Mn of 1860 g/mol and a weight-average molar mass Mw of 4860 g/mol, $(MeSiO_{3/2})_{0.36}(ViSiO_{3/2})_{0.09}(Me(MeO)SiO_{2/2})_{0.39}(Vi(MeO)SiO_{2/2})_{0.10}(Me(HO)SiO_{2/2})_{0.02}(Me_2SiO_{2/2})_{0.01}(Me(MeO)_2SiO_{1/2})_{0.03}$ with a number-average molar mass Mn of 1680 g/mol and a weight-average molar mass Mw of 4340 g/mol, $(MeSiO_{3/2})_{0.40}(ViSiO_{3/2})_{0.10}(Me(MeO)SiO_{2/2})_{0.34}(Vi(MeO)SiO_{2/2})_{0.08}(Me(HO)SiO_{2/2})_{0.02}(Me_2SiO_{2/2})_{0.01}(Me(MeO)_2SiO_{1/2})_{0.02}(Me_3SiO_{1/2})_{0.03}$ with a number-average molar mass Mn of 1640 g/mol and a weight-average molar mass Mw of 4080 g/mol, $(MeSiO_{3/2})_{0.44}(MaSiO_{3/2})_{0.11}(Me(MeO)SiO_{2/2})_{0.28}(Ma(MeO)SiO_{2/2})_{0.07}(Me(HO)SiO_{2/2})_{0.02}(Ma(HO)SiO_{2/2})_{0.01}(Me_2SiO_{2/2})_{0.01}(Me(MeO)_2SiO_{1/2})_{0.03}(Me_3SiO_{1/2})_{0.03}$ with a number-average molar mass Mn of 1710 g/mol and a weight-average molar mass Mw of 4700 g/mol, $(MeSiO_{3/2})_{0.48}(ViSiO_{3/2})_{0.12}(Me(MeO)SiO_{2/2})_{0.26}(Vi(MeO)SiO_{2/2})_{0.07}(Me(HO)SiO_{2/2})_{0.02}(Me_2SiO_{2/2})_{0.03}(Me(MeO)_2SiO_{1/2})_{0.01}(Me_2(OH)SiO_{1/2})_{0.01}$ with a number-average molar mass Mn of 1710 g/mol and a weight-average molar mass Mw of 4700 g/mol, $(MeSiO_{3/2})_{0.48}(ViSiO_{3/2})_{0.12}(IoSiO_{3/2})_{0.01}(Me(MeO)SiO_{2/2})_{0.26}(Vi(MeO)SiO_{2/2})_{0.07}(Me(HO)SiO_{2/2})_{0.02}(Io(HO)SiO_{2/2})_{0.01}(Me_2SiO_{2/2})_{0.01}(Me(MeO)_2SiO_{1/2})_{0.01}(Io(OH)_2SiO_{1/2})_{0.01}$ with a number-average molar mass Mn of 1540 g/mol and a weight-average molar mass Mw of 3630 g/mol, $(MeSiO_{3/2})_{0.25}(ViSiO_{3/2})_{0.10}(PhSiO_{3/2})_{0.15}(Me(MeO)SiO_{2/2})_{0.21}(Vi(MeO)SiO_{2/2})_{0.09}(Ph(MeO)SiO_{2/2})_{0.11}(Me(HO)SiO_{2/2})_{0.01}(Ph(HO)SiO_{2/2})_{0.02}(Me_2SiO_{2/2})_{0.01}(Me(Me(O)_2SiO_{1/2})_{0.01}(Ph(OH)(MeO)SiO_{1/2})_{0.01}(Me_3SiO_{1/2})_{0.03}$ with a number-average molar mass Mn of 1040 g/mol and a weight-average molar mass Mw of 1590 g/mol, $(MeSiO_{3/2})_{0.46}(ViSiO_{3/2})_{0.11}(Me(EtO)SiO_{2/2})_{0.28}(Vi(EtO)SiO_{2/2})_{0.08}(Me(HO)SiO_{2/2})_{0.02}(Me_2SiO_{2/2})_{0.01}(Me(EtO)_2SiO_{1/2})_{0.01}(Me_3SiO_{1/2})_{0.03}$ with a number-average molar mass Mn of 1610 g/mol and a weight-average molar mass Mw of 3690 g/mol, $(MeSiO_{3/2})_{0.29}(ViSiO_{3/2})_{0.22}(Me(MeO)SiO_{2/2})_{0.08}(Vi(MeO)SiO_{2/2})_{0.06}(Me(HO)SiO_{2/2})_{0.01}(Me_2SiO_{2/2})_{0.24}(Me(MeO)_2SiO_{1/2})_{0.01}(Me(MeO)SiO_{2/2})_{0.05}(Me_3SiO_{1/2})_{0.04}$ with a number-average molar mass Mn of 2200 g/mol and a weight-average molar mass Mw of 6800 g/mol, where Me denotes the methyl, Vi the vinyl, Et the ethyl, Ph the phenyl, Ma the 3-methacryloyloxypropyl and Io the 2,4,4-trimethylpentyl radicals.

The resins (A) used in the invention may be solid or liquid at 23° C. and 1000 hPa, with the resins (A) preferably being liquid at 23° C. and 1000 hPa.

If the resins (A) used in the invention are liquid, they preferably have a dynamic viscosity of at least 1000 mPa·s, more preferably 1500 mPa·s to 1,000,000 mPa·s, and most preferably 3000 mPa·s to 100,000 mPa·s, in each case at 23° C.

In the context of the present invention the dynamic viscosity is determined in accordance with DIN 53019 at a temperature, unless otherwise specified, of 23° C. and at an atmospheric pressure of 1013 hPa. The measurement is carried out using a Physica MCR 300 rotational rheometer from Anton Paar. In this case a coaxial cylinder measuring system (CC 27) with an annular measuring gap of 1.13 mm is utilized for viscosities from 1 to 200 mPa·s, and a cone-plate measuring system (Searle System with CP 50-1 measuring cone) is used for viscosities of greater than 200 mPa·s. The shear rate is adapted to the polymer viscosity (1 to 99 mPa·s at 100 $s^{-1}$; 100 to 999 mPa·s at 200 $s^{-1}$; 1000 to 2999 mPa·s at 120 $s^{-1}$; 3000 to 4999 mPa·s at 80 $s^{-1}$; 5000 to 9999 mPa·s at 62 $s^{-1}$; 10,000 to 12,499 mPa·s at 50 $s^{-1}$; 12,500 to 15,999 mPa·s at 38.5 $s^{-1}$; 16,000 to 19,999 mPa·s at 33 $s^{-1}$; 20,000 to 24,999 mPa·s at 25 $s^{-1}$; 25,000 to 29,999 mPa·s at 20 $s^{-1}$; 30,000 to 39,999 mPa·s at 17 $s^{-1}$; 40,000 to 59,999 mPa·s at 10 s$^{-1}$; 60,000 to 149,999 at 5 s$^{-1}$; 150,000 to 199,999 mPa·s at 3.3 s$^{-1}$; 200,000 to 299,999 mPa·s at 2.5 s$^{-1}$; 300,000 to 1,000,000 mPa·s at 1.5 s$^{-1}$.

After the measuring system has been conditioned to the measuring temperature, a three-stage measuring program is employed, consisting of a run-up phase, preliminary shearing, and viscosity measurement. The run-up phase takes place by graduated increase of the shear rate within a minute to the shear rate as indicated above at which the measurement is to take place, this rate being dependent on the anticipated viscosity. As soon as this has been achieved, preliminary shearing takes place at constant shear rate for 30 s, after which the viscosity is determined by implementation of 25 individual measurements each for 4.8 s, from which the mean value is determined. The mean value corresponds to the dynamic viscosity, which is reported in mPa·s.

The resins (A) used in the invention preferably have a number-average molar mass Mn of preferably 1000 to 6000 g/mol, more preferably 1100 g/mol to 5000 g/mol, yet more preferably 1200 g/mol to 4000 g/mol, and most preferably 1400 g/mol to 3000 g/mol.

In the context of the present invention, the number-average molar mass Mn and the weight-average molar mass Mw, rounded to whole numbers of 10 in accordance with DIN 1333:1992-02 section 4, are determined with size exclusion chromatography (SEC/GPC) in accordance with DIN 55672-1/ISO 160414-1 and also ISO 160414-3, by using polystyrene standards to calibrate a column set based on polystyrene-co-divinylbenzene as stationary phase and composed of three columns with different pore size distributions, in the sequence 10,000 Å, 500 Å and 100 Å, with an exclusion size of greater than 450.000 g/mol. Phenyl-containing components are determined using THF as eluent, nonphenyl-containing components using toluene as eluent. The analyses are conducted at a column temperature of 40±1° C. and with a refractive index detector.

The resins (A) used in the invention are commercially customary products and/or are preparable by methods which are common in chemistry.

The compounds (B) used in the invention are preferably compounds having 5 to 50 carbon atoms, more preferably 6 to 20 carbon atoms.

The compounds (B) used in the invention are preferably organic compounds having at least one unit of the formula (II) which are free from silicon atoms.

The compounds (B) used in the invention are preferably liquid at temperatures below 60° C., more preferably below 40° C., and most preferably below 30° C., in each case at a pressure of 1000 hPa.

The compounds (B) used in the invention have a boiling point at temperatures of preferably at least 120° C., more preferably at temperatures of at least 150° C., more particularly at temperatures of at least 200° C., in each case at a pressure of 1000 hPa.

Examples of radical $R^3$ are the radicals stated for R and $R^1$, and also the cyano radical.

Radical $R^3$ preferably comprises hydrogen or methyl radicals.

Examples of radical $R^5$ are the radicals stated for R and $R^1$.

Radical $R^5$ preferably comprises hydrogen or monovalent, aliphatically saturated hydrocarbon radicals, more preferably hydrogen or the methyl radical.

Radical Z preferably comprises —O—.

The compounds (B) are preferably organic acrylates or methacrylates, more preferably organic mono-, di- or triacrylates or organic mono-, di- or trimethacrylates, most prefereably organic mono- or diacrylates or organic mono- or dimethacrylates.

Examples of compounds (B) used in the invention are tripropylene glycol diacrylate (CAS: 42978-66-5), (1-methylethylidene)bis(4,1-phenyleneoxy-3,1-propanediyl) bismethacrylate (CAS: 27689-12-9), tris(2-acryloyloxyethyl) isocyanurate (CAS: 40220-08-4), (5-ethyl-1, 3-dioxan-5-yl) methyl acrylate (CAS: 66492-51-1), (octahydro-4,7-methano-1H-indenediyl)bis(methylene) diacrylate (CAS: 42594-17-2), (octahydro-4,7-methano-1H-indenediyl)bis(methylene) dimethacrylate (CAS: 43048-08-4), [2-(acryloyloxy)ethyl]trimethylammonium chloride (CAS: 44992-01-0), [2-(methacryloyloxy)ethyl]trimethylammonium chloride (CAS: 5039-78-1), 1,1,1-trimethylolethane trimethacrylate (CAS: 24690-33-3), 1,1,1-trimethylolethane triacrylate (CAS: 19778-85-9), 1,12-dodecanediol dimethacrylate (CAS: 72829-09-5), 1,2,5-pentanetriol trimethacrylate (CAS: 287196-31-0), 1,3-propanediol diacrylate (CAS: 24493-53-6), 1,3-butanediol diacrylate (CAS: 19485-03-1), 1,3-butanediol dimethacrylate (CAS: 1189-08-8), 1,4-butanediol diacrylate (CAS: 1070-70-8), 1,4-butanediol dimethacrylate (CAS: 2082-81-7), 1,5-pentanediol diacrylate, 1,5-pentanediol dimethacrylate, 1,6-hexanediol diacrylate (CAS: 13048-33-4), 1,6-hexanediol dimethacrylate (CAS: 6606-59-3), 1,7-heptanediol dimethacrylate, 1,8-octanediol dimethacrylate, 1,9-nonanediol diacrylate (CAS: 107481-28-7), 1,9-nonanediol dimethacrylate (CAS: 65833-30-9), 1,10-decanediol diacrylate (CAS: 13048-34-5), 1,10-decanediol dimethacrylate (CAS: 6701-13-9), 1,4-cyclohexanediol dimethacrylate (CAS: 38479-34-4), 1,4-butanediylbis[oxy(2-hydroxy-3,1-propanediyl)] diacrylate (CAS: 52408-42-1), 2-(1-(2-hydroxy-3,5-di-tert-pentylphenyl)ethyl)-4,6-di-tert-pentylphenyl acrylate (CAS: 123968-25-2), 2-(2-oxo-1-imidazolidinyl)ethyl methacrylate (CAS: 86261-90-7), 2-(2-vinyloxyethoxy)ethyl acrylate (CAS RN: 86273-46-3), 2-(diethylamino)ethyl methacrylate (CAS: 105-16-8), 2-(dimethylamino)ethyl acrylate (CAS: 2439-35-2), 2-(dimethylamino)ethyl methacrylate (CAS: 2867-47-2), 2-(methacryloyloxy) ethyl acetoacetate (CAS: 21282-97-3), 2,2,2-trifluoroethyl methacrylate, 2,2,6,6-tetramethyl-4-piperidyl acrylate, 2,2,6,6-tetramethyl-4-piperidyl methacrylate, 2,2-dimethylpropanediol dimethacrylate (CAS: 1985-51-9), 2,3-dihydroxypropyl methacrylate, 2,3-epoxypropyl methacrylate, 2-[[2,2-bis[[(1-oxoallyl)oxy]methyl]butoxy]methyl]-2-ethyl-1,3-propanediyl diacrylate (CAS: 94108-97-1), 2-[2-(2-ethoxyethoxy) ethoxy]ethyl methacrylate (CAS: 39670-09-2), 2-[2,2-bis(2-prop-2-enoyloxyethoxymethyl)butoxy]ethyl 3-(dibutylamino)propanoate (CAS: 195008-76-5), bisphenol A ethoxylate dimethacrylate (CAS: 41637-38-1), 2-allyloxyethoxyethyl methacrylate (CAS: 58985-94-7), 2-butene 1,4-dimethacrylate, 2-butyl-2-ethyl-1,3-propanediol dimethacrylate, 2-chloroethyl methacrylate, 2-cyanoethyl acrylate, 2-cyanoethyl methacrylate, 2-ethoxyethyl methacrylate, 2-ethylbutyl methacrylate, octocrylene (CAS: 6197-30-4), 2-ethylhexyl acrylate (CAS: 103-11-7), 2-ethylhexyl methacrylate (CAS: 688-84-6), 2-ethylhexyl trans-4-methoxycinnamate (CAS: 83834-59-7), 2-hydroxy-3-phenoxypropyl acrylate, 2-hydroxy-3-phenoxypropyl methacrylate, 2-hydroxyethyl acrylate, 2-hydroxyethyl methacrylate, 2-isocyanatoethyl acrylate, 2-isocyanatoethyl methacrylate, 2-methoxyethyl 2-cyanoacrylate, 2-methoxyethyl acrylate (CAS: 3121-61-7), 2-methoxyethyl methacrylate, 2-methylbutyl acrylate, 2-methylbutyl methacrylate, 2-methylhexadecyl 2-methylprop-2-enoate, 2-n-butoxyethyl methacrylate, 2-N-morpholinoethyl methacrylate, 2-octyl cyanoacrylate, 2-phenoxyethyl acrylate (CAS: 48145-04-6), 2-phenoxyethyl methacrylate, 2-phenylethyl 2-cyanoprop-2-enoate (CAS: 160583-22-2), 2-phenylethyl methacrylate, 2-propylheptyl acrylate (CAS: 149021-58-9), 2-propylheptyl methacrylate, 2-tert-butylaminoethyl methacrylate, 3-(acryloyloxy)-2-hydroxypropyl methacrylate (CAS: 1709-71-3), 3-(prop-2-enoyloxy)-2,2-bis[(prop-2-enoyloxy)methyl]propyl prop-2-enoate (CAS: 144086-02-2), 3,3,4,4,5,5,6,6,7,7,8,8,8-tridecafluorooctyl acrylate, 3,3,4,4,5,5,6,6,7,7,8,8,8-tridecafluorooctyl methacrylate, 3,4-epoxycyclohexylmethyl methacrylate, 3,5,5-trimethylhexyl methacrylate, 3,6,9-trithiaundecamethylene 1,11-dimethacrylate, 3-chloro-2-hydroxypropyl methacrylate, 3-dimethylaminopropyl methacrylate, 3-hydroxy-2,2-dimethylpropyl 3-hydroxy-2,2-dimethylpropionate (CAS: 1115-20-4), 3-methoxybutyl methacrylate, 3-methyl-1,5-pentanediyl diacrylate, 3-phenylpropyl methacrylate, 4-(1,1-dimethylethyl)cyclohexyl acrylate, 4-cumylphenyl methacrylate, 4-hydroxybutyl acrylate (CAS: 2478-10-6), 4-phenylbutyl methacrylate, 6-(2,5-dihydro-3,4-dimethyl-2,5-dioxo-1H-pyrrol-1-yl)hexyl methacrylate, 6-chlorohexyl methacrylate, 7-oxabicyclo[4.1.0]heptan-3-ylmethyl 2-methylprop-2-enoate, acetoacetoxyethyl methacrylate, acrylic acid, allyl methacrylate, allyloxyethyl methacrylate, allyloxypropyl methacrylate, behenyl acrylate, behenyl methacrylate, benzyl cinnamate, benzyldimethyl[2-[(1-oxoallyl)oxy]ethyl]ammonium chloride, benzyl methacrylate, bisphenol A dimethacrylate, bisphenol A ethoxylate dimethacrylate, butyl 2-cyanoacrylate (enbucrilate), butyl diglycol methacrylate, Cardura acrylate, cinnamyl methacrylate, crotyl methacrylate, cyclohexyl methacrylate, cyclopentyl methacrylate, D,L-menthyl methacrylate, dicyclopentanyl methacrylate, dicyclopentenyloxyethyl methacrylate (CAS: 68586-19-6), diethylene glycol butyl ether methacrylate, diethylene glycol dimethacrylate, dipropylene glycol dimethacrylate, diurethane dimethacrylate, mixture of isomers (CAS: 72869-86-4) epoxy acrylate (CAS: 55818-57-0), epoxy acrylate (CAS: 68958-77-0), ethyl 2-cyano-3,3-diphenylacrylate, ethyl 2-cyano-3-ethoxyacrylate, ethyl 2-cyanoacrylate (CAS: 7085-85-0), ethyl 3-benzoylacrylate, ethyl cinnamate, ethyl diglycol methacrylate, ethylene glycol dimethacrylate (CAS: 97-90-5), ethyl acrylate, ethyl methacrylate, ethylthioethyl methacrylate, ethyl trans-3-(N,N-dimethylamino) acrylate, ethyl triethylene glycol methacrylate, ethyl triglycol methacrylate, furfuryl methacrylate, glycerol dimethacrylate, glycerol methacrylate, glycerol propoxytriacrylate, glycerol trimethacrylate, hexadecyl acrylate, hexadecyl methacrylate (CAS: 2495-27-4), hexahydro-4,7-methano-1H-indenyl acrylate (dihydrocyclopentadienyl acrylate), hexoxyethyl methacrylate, hydantoin hexacrylate, hydroxybutyl methacrylate, hydroxypropyl acrylate (CAS: 25584-83-2), hydroxypropyl methacrylate (CAS: 27813-02-1), icosyl acrylate, icosyl methacrylate, isobornyl acrylate (CAS: 5888-33-5), isobornyl methacrylate (CAS: 7534-94-3), isobutyl acrylate, isobutyl methacrylate, isocyanatoethyl methacrylate, isodecyl acrylate, isodecyl methacrylate, isooctyl acrylate (CAS: 29590-42-9), isopentyl methacrylate, isopentyl p-methoxycinnamate, isopropyl (2Z)-3-iodoacrylate, isopropyl acrylate, isopropyl methacrylate, isotridecyl methacrylate, methacrylate, methacryloylacetone, 3-methylbut-2-yl methacrylate, methacrylic anhydride, methacrylic acid, methallyl methacrylate, methoxyethoxyethyl methacrylate, methoxypropyl methacrylate, methyl-2-cyanoacrylate, methyl 2-fluoroacrylate, methyl 3-methoxyacrylate, methyl 3-methyl-2-butenoate, methyl acrylate, methyl buten-2-yl-1-methacrylate, methyl cinnamate, methyl methacrylate, methyl p-hydroxycinnamate, methyltripropylene glycol methacrylate, N,N-diethylaminoethyl methacrylate, meopentyl glycol-propoxylated diacrylate (CAS: 84170-74-1), neopentyl glycol dimethacrylate (CAS: 1985-51-9), neopentyl methacrylate, n-butyl acrylate, n-butyl methacrylate (CAS: 97-88-1), n-decyl acrylate, n-decyl methacrylate, n-dodecyl acrylate, n-dodecyl methacrylate (CAS: 142-90-5), n-heptyl acrylate, n-heptyl methacrylate, n-hexyl acrylate, n-hexyl methacrylate, n-nonyl acrylate, n-nonyl methacrylate, n-octadecyl acrylate, n-octadecyl methacrylate, n-octyl acrylate, n-octyl cyanoacrylate, n-octyl methacrylate, norbornyl methacrylate, n-pentyl acrylate, n-pentyl methacrylate, n-propyl acrylate, n-propyl methacrylate, n-undecyl acrylate, n-undecyl methacrylate, octyl cyanoacrylate (CAS: 133978-15-1), dipropylene glycol diacrylate (CAS: 57472-68-1), pentaaerythritol acrylate (CAS: 1245638-61-2), pentaerythritol dimethacrylate, pentaerythritol tetraacrylate; phenyl methacrylate, phosphoric acid 2-hydroxyethyl methacrylate ester (CAS: 52628-03-2), piperidineethyl methacrylate, p-nitrophenyl methacrylate, polyether polytetraacrylate (CAS: 51728-26-8), polyethylene glycol dimethacrylate, polypropylene glycol diacrylate (CAS: 52496-08-9), polypropylene glycol dimethacrylate (CAS: 25852-49-7), propargyl methacrylate, p-vinylbenzyl methacrylate, sec-butyl acrylate, sec-butyl methacrylate, sec-pentyl methacrylate, soybean oil, epoxidized, acrylate (CAS: 91722-14-4), sorbitol dimethacrylate, sorbitol methacrylate, sorbitol pentamethacrylate, sulfoethyl methacrylate, tert-butyl acrylate, tert-butylaminoethyl methacrylate, tert-butyl methacrylate, tetradecyl acrylate, tetradecyl methacrylate, tetrahydrofurfuryl methacrylate, tridecyl acrylate, tridecyl methacrylate, triethylene glycol dimethacrylate (CAS: 109-16-0), trimethylolpropane ethoxylate triacrylate (CAS: 28961-43-5), trimethylolpropane triacrylate (CAS: 15625-89-5), trimethylolpropane trimethacrylate (CAS: 3290-92-4), trityl methacrylate, ureido methacrylate, vinyl 4-methacryloyloxybutyl ether, vinyl methacrylate, acrylamide, 2-acrylamido-2-methylpropanesulfonic acid, N-tert-butylacrylamide, N-(hydroxymethyl)methacrylamide, N-[3-(dimethylamino)propyl]methacrylamide, methacrylamide, N,N-dimethylacrylamide, N,N-dimethylmethacrylamide, N-(1,1,3,3-tetramethylbutyl)acrylamide, N-(1,1-dimethyl-3-oxobutyl)acrylamide (CAS: 2873-97-4), N-(hydroxymethyl)acrylamide, N-[3-(dimethylamino)propyl]acrylamide, N-[3-benzotriazol-2-yl-2-hydroxy-5-(1,1,3,3-tetramethylbutyl)benzyl]-2-methylacrylamide, N-[4-cyano-3-trifluoromethylphenyl]methacrylamide, N-isopropylmethacrylamide, methyl 2-hydroxy-2-(1-oxo-2-propenylamino)acetate, methyl 2-methoxy-2-[1-oxo-2-(propenyl)amino]acetate, 2-isobutyryl-3,N-diphenylacrylamide, N-phenylprop-2-enamide, N-(2,2-dimethoxyethyl)prop-2-enamide, N-methylmethacrylamide, N-ethylacrylamide, N-ethylmethacrylamide, N,N-diethylacrylamide, N,N-diethylmethacrylamide, N-propylmethacrylamide, N-methylolmethacrylamide, N-cyclohexylmethacrylamide, N-tert-butylmethacrylamide, N-tert-butylacrylamide, N,N'-methylenebis(methacrylamide), N,N'-methylenebis(acrylamide), N-(isobutoxymethyl)acrylamide, N-(isobutoxymethyl)methacrylamide, N-2-hydroxyethylacrylamide, N-2-hydroxyethylmethacrylamide, N,N'-hexamethylenebis(methacrylamide), N,N'-hexamethylenebis(acrylamide), N,N-dimethylaminoethylmethacrylamide, 1,1,5,5-tetramethacrylamide-n-pentane, N,N-dimethylaminopropylmethacrylamide (CAS: 5205-93-6) and N-dodecylacrylamide.

Very preferably, compounds (B) used in the invention are triethylene glycol dimethacrylate (CAS: 109-16-0), trimethylolpropane triacrylate (CAS: 15625-89-5), n-butyl methacrylate (CAS: 97-88-1), n-dodecyl methacrylate (CAS: 142-90-5), 2-ethylhexyl acrylate (CAS: 103-11-7), 2-ethylhexyl methacrylate (CAS: 688-84-6), 2-hydroxyethyl acrylate (CAS: 818-61-1), 2-hydroxyethyl methacrylate (CAS: 868-77-9), hydroxypropyl acrylate (CAS: 25584-83-2), hydroxypropyl methacrylate (CAS: 27813-02-1), 2-methoxyethyl acrylate (CAS: 3121-61-7), ethylene glycol dimethacrylate (CAS: 97-90-5), isobornyl acrylate (CAS: 5888-33-5), isobornyl methacrylate (CAS: 7534-94-3), glycerol propoxytriacrylate (CAS: 52408-84-1), 1,4-butanediol dimethacrylate (CAS: 2082-81-7), 1,6-hexanediol dimethacrylate (CAS: 6606-59-3), 1,9-nonandiol diacrylate (CAS: 107481-28-7), dipropylene glycol diacrylate (CAS: 57472-68-1), polypropylene glycol diacrylate (CAS: 52496-08-9), polypropylene glycol dimethacrylate (CAS: 25852-49-7) or 2-(dimethylamino)ethyl methacrylate (CAS: 2867-47-2).

The compositions of the invention preferably comprise component (B) in amounts of 1 to 250 parts by weight, more preferably 10 to 100 parts by weight, most preferably 15 to 50 parts by weight, based in each case on 100 parts by weight of component (A).

The compositions of the invention preferably comprise at least two different components (B), more preferably at least two different acrylates or methacrylates (B), and more particularly a component (B) comprises compounds selected from 2-hydroxyethyl acrylate, 2-hydroxyethyl methacrylate, hydroxypropyl acrylate and hydroxypropyl methacrylate.

Very preferably the compositions of the invention comprise at least one component (B) selected from 2-hydroxyethyl acrylate, 2-hydroxyethyl methacrylate, hydroxypropyl acrylate and hydroxypropyl methacrylate and also at least one further component (B) selected from 1,6-hexanediol dimethacrylate (CAS: 6606-59-3), 1,9-nonanediol diacrylate (CAS: 107481-28-7), polypropylene glycol diacrylate (CAS: 52496-08-9), polypropylene glycol dimethacrylate (CAS: 25852-49-7), 2-ethylhexyl acrylate (CAS: 103-11-7), 2-ethylhexyl methacrylate (CAS: 688-84-6), isobornyl acrylate (CAS: 5888-33-5) and isobornyl methacrylate (CAS: 7534-94-3), these compositions advantageously being low in odor.

In a further, especially preferred variant, the compositions of the invention comprise at least one component (B) selected from 2-hydroxyethyl acrylate, 2-hydroxyethyl methacrylate, hydroxypropyl acrylate and hydroxypropyl methacrylate and also at least one further component (B) selected from n-butyl methacrylate, sec-butyl methacrylate, isobutyl methacrylate, tert-butyl methacrylate, n-butyl acrylate, sec-butyl acrylate, isobutyl acrylate and tert-butyl acrylate.

The compositions of the invention may be crosslinked in accordance with the existing polymerization techniques, e.g., thermally or by UV irradiation, with a preference for thermal activation.

Initiators (C) may be any existing radical initiators, such as, for example, organic or inorganic peroxides, azocompounds, C—C initiators or radical-forming curing agent systems in combination with a metal salt as described in DE-A 10 2013 114 061 and EP-B 2 985 318.

Examples of initiators (C) are free radical initiators such as organic peroxides, for example 2-butanone peroxide, methyl ethyl ketone peroxide, cyclohexanone peroxide, acetylacetone peroxide, methyl isobutyl ketone peroxide, dilauroyl peroxide, dibenzoyl peroxide, di(2,4-dichlorobenzoyl)peroxide, di(4-methylbenzoyl)peroxide, di(tert-butylperoxyisopropyl)benzene, dicumylperoxide, 2,5-dimethyl-2,5-di(tert-butylperoxy)hexane, 2,5-dimethyl-2,5-di(tert-butylperoxy)hex-3-yne, di-tert-butylperoxide, tert-buty cumyl peroxide, tert-butyl monoperoxymaleate, tert-amylperoxy 2-ethylhexanoate, tert-amyl peroxyneodecanoate, tert-butyl peroxyisobutyrate, tert-butyl peroxy-3,5,5-trimethylhexanoate, tert-butyl peroxybenzoate, butyl-4,4-di(tert-butylperoxy)valerate, 1,1-di(tert-butylperoxy)-3,3,5-trimethylcyclohexane, cumyl hydroperoxide, tert-butyl hydroperoxide, di(4-tert-butylcyclohexyl) peroxydicarbonate, di(n-propyl) peroxydicarbonate and tert-butyl peroxy-2-ethylhexyl carbonate; azo initiators such as azobis(isobutyronitrile), 1,1'-azobis(cyclohexanecarbonitrile) and 1,1-azobis(hexahydrobenzonitrile); and C—C initiators such as 1,1,2,2-tetraphenyl-1,2-ethanediol.

The initiators (C) used in the invention may be dispersed or dissolved in optionally employed organosilicon compounds (G) or solvents (L).

The initiators (C) used in the invention may be solid or liquid at 23° C. and 1000 hPa; initiators (C) which are liquid at 23° C. and 1000 hPa are preferred.

If initiators (C) are dispersed or dissolved in optionally employed organosilicon compounds (G) or solvents (L), then components (G) or (L) preferably have a boiling point of at least 100° C., more preferably of at least 150° C., most preferably at least 200° C., in each case at a pressure of 1000 hPa.

Preference is given to using thermally activatable initiators (C) which have a 1 h half-life temperature in the range from 60° C. to 200° C., more preferably in the range from 80° C. to 160° C., most preferably in the range from 90° C. to 130° C.

The compositions of the invention preferably comprise component (C) in amounts of 0.1 to 5 parts by weight, more preferably 0.2 to 3 parts by weight, most preferably 0.3 to 2 parts by weight, based in each case on 100 parts by weight of the sum of components (A) and (B).

The fillers (D) used in the compositions of the invention may be any desired fillers known to date.

The fillers (D) used in the invention are preferably fillers which dissolve less than 1 wt % in toluene at 23° C. and 1000 hPa.

Examples of fillers (D) are nonreinforcing fillers, these being fillers preferably having a BET surface area of up to 50 $m^2/g$, such as quartz, quartz powders, quartz granules, fused quartz powders, quartz glass powders, glass powders, cristobalite, cristobalite powders, cristobalite granules, diatomaceous earth; water-insoluble silicates such as calcium silicate, magnesium silicate, zirconium silicate, talc, kaolin, zeolites; metal oxide powders such as aluminum, titanium, iron or zinc oxides and their mixed oxides; barium sulfate, calcium carbonate, marble flour, gypsum, silicon nitride, silicon carbide, boron nitride, plastics powders such as polyacrylonitrile powders; reinforcing fillers, these being fillers having a BET surface area of more than 50 $m^2/g$, such as pyrogenically produced silica, precipitated silica, precipitated chalk, carbon black, such as furnace black and acetylene black, and mixed silicon aluminum oxides of high BET surface area; aluminum trihydroxide, magnesium hydroxide, hollow-sphere fillers, such as ceramic microspheres, examples being those obtainable under the trade name Zeeospheres™ from 3M Deutschland GmbH at Neuss, Germany; fibrous fillers, such as wollastonite, montmorillonite, bentonite, and also chopped and/or ground fibers of glass (short glass fibers) or mineral wool; fibrous wovens consisting of glass, carbon or plastic. The stated fillers may have been rendered hydrophobic, through treatment, for example, with organosilanes and/or organosiloxanes or with stearic acid.

The fillers (D) used in the invention may be employed either each individually or else in any desired mixture with one another.

Component (D) preferably comprises a component selected from particulate fillers, including fibers up to a length of 5 cm (D1) and semifinished fiber product comprising fibers having a length of more than 5 cm (D2).

The fillers (D1) used in the invention preferably have an $SiO_2$ content of more than 85 wt %, more preferably more than 95 wt %, most preferably more than 97 wt %.

The fillers (D1) used in the invention preferably comprise inorganic fillers, more preferably inorganic, silicon-containing fillers, most preferably those from natural sources, such as quartz, quartz powders, quartz granules, fused quartz powders, cristobalite, cristobalite powders, cristobalite granules, and fibrous, silicon-containing fillers from natural sources such as montmorillonite and wollastonite, or synthetic, silicon-containing products such as pyrogenic silica, which may be obtained by flame hydrolysis of, e.g., tetrachlorosilane in an oxyhydrogen gas flame (fumed silica), or inorganic, fibrous, synthetic, silicon-containing fillers such as chopped or ground short glass fibers.

With particular preference filler (D1) comprises quartz powders, quartz granules, cristobalite powders, cristobalite granules, montmorillonite or wollastonite.

More particularly filler (D1) comprises quartz powders, quartz granules, cristobalite powders or cristobalite granules.

The fillers (D2) used are preferably wovens, laid scrims, knits, braids, mats or nonwovens, where the fibers may consist of any fiber-forming materials known to date, such as inorganic fibers of basalt, boron, glass, ceramic or quartz; metallic fibers of steel; organic fibers of aramid, carbon, PPBO, polyester, polyamide, polyethylene or polypropylene; and also natural fibers of flax, hemp, wood or sisal.

The fillers (D1) and (D2) used in the invention may optionally have been surface treated. Preferably the fillers (D1) used in the invention are not surface treated. Preferably the fillers (D2) used in the invention are surface treated.

In one preferred embodiment the compositions of the invention are compositions whose fillers (D) comprise particulate fillers (D1) (composition 1).

In one preferred embodiment the compositions 1 of the invention comprise, as component (D1), mixtures comprising fine-particle and coarse-particle fillers.

If the filler (D1) in the compositions 1 of the invention comprises mixtures of fine and coarse fillers, the fillers involved are preferably selected from quartz and cristobalite, and more preferably are quartz and cristobalite from natural sources, and more particularly are mixtures of fine and coarse quartz.

The fine-particle fillers (D1) used in the invention preferably have particles sizes of 0.02 µm to less than 200 µm, more preferably 0.1 µm to less than 200 µm, most preferably 0.3 µm to 100 µm. Preferably at most 90 wt % of the fine-particle fillers (D1) used in the invention have particle sizes of 0.02 µm to less than 100 µm, and more preferably at most 90 wt % of the fine-particle fillers (D1) used in the invention have particle sizes of 0.02 µm to less than 70 µm. In the case of fibrous fillers, this corresponds to the longest extent of the fiber.

The coarse-particle fillers (D1) used in the invention preferably have particle sizes of at least 0.2 mm, more preferably from 0.2 mm to 10 mm, yet more preferably from 0.2 mm to 5 mm, most preferably 0.2 mm to 3 mm.

In a further preferred embodiment, component (D1) consists to an extent of at least 80 wt %, more preferably at least 90 wt %, of a mixture of fine-particle fillers having particle sizes of 0.1 µm to less than 200 µm and coarse-particle fillers having particle sizes of 0.2 mm to 10 mm.

Used more particularly as coarse-particle filler (D1) is quartz or cristobalite from natural sources.

If mixtures of fine-particle and coarse-particle fillers are used as component (D1), then the weight ratio of fine-particle to coarse-particle fillers is preferably 5:1 to 1:5, more preferably 4:1 to 1:4, most preferably 3:1 to 1:3.

Changes in the proportion of fine-particle to coarse-particle fillers may also be accompanied by changes in the flexural strength; for example, as the ratio of fine-particle to coarse-particle fillers goes up, the flexural strength may go up, in which case it may be necessary to increase the fraction of components (A) and (B) as a proportion of the overall mixture, owing to the larger overall surface area of the filler particles.

The particle size distribution of particles >500 µm is analyzed preferably using an ALPINE e200 LS air jet sieve, with analytical sieves meeting the requirements of DIN ISO 3310-1. The particle size distribution in the range from about 0.02 µm to 500 µm is analyzed preferably using a CILAS 1064 PARTICLE SIZE ANALYZER from Cilas.

In another preferred embodiment, the compositions 1 of the invention comprise as component (D1) exclusively fine-particle fillers.

The compositions 1 of the invention comprise fillers (D1) in amounts of in total preferably 70 to 99 parts by weight, more preferably from 80 to 95 parts by weight, more particularly from 87 to 92 parts by weight, based in each case on 100 parts by weight of the composition.

Filler (D) in the compositions 1 of the invention consists preferably predominantly and more preferably completely of filler (D1).

In another preferred embodiment, the compositions of the invention are compositions which as fillers (D) comprise semifinished fiber products (D2) (composition 2).

Filler (D2) in the compositions 2 of the invention preferably comprises fibrous wovens, fibrous laid scrims, fibrous knits or fibrous braids, more preferably each consisting of carbon fibers, glass fibers or aramid.

The fibrous wovens (D2) or fibrous laid scrims (D2) used in the invention are preferably employed in each case in a plurality of plies.

The compositions 2 of the invention comprise fillers (D2) in amounts of in total preferably 40 to 90 parts by weight, more preferably from 50 to 80 parts by weight, based in each case on 100 parts by weight of the composition.

Filler (D) in the compositions 2 of the invention consists preferably predominantly and more preferably completely of component (D2).

In one preferred embodiment, component (D2) consists to an extent of at least 80 wt %, more preferably at least 90 wt %, of fibrous wovens, fibrous laid scrims, fibrous knits or fibrous braids.

In addition to components (A), (B), (C) and (D), the compositions of the invention may comprise further substances which are different from components (A), (B), (C) and (D), examples of such substances being accelerators (E), auxiliaries (F), organosilicon compounds (G), stabilizers (H), solvents (L) and modifiers (M).

The accelerators (E) used in the compositions of the invention may be any desired accelerators known to date for materials crosslinkable radically and through condensation reaction.

Examples of optionally employed component (E) are metal salts and organic bases such as bismuth(III) 2-ethylhexanoate, bismuth(III) acetylacetonate, dioctyltin(IV) laurate, zinc(II) 2-ethylhexanoate, zinc(II) acetylacetonate, zirconium(IV) 2-ethylhexanoate, aluminum(III) ethoxide, aluminum(III) acetylacetonate, titanium(IV) bis(ethylacetoacetate) diisobutoxide, titanium(IV) n-butoxide, titanium (IV) n-propoxide, titanium(IV) bis(ethylacetoacetate) diisopropoxide, titanium(IV) bis(acetylacetonate) diisobutoxide, cobalt(II) 2-ethylhexanoate, copper(II) acetate, copper(I) chloride, manganese(II) acetate, iron(II) acetate, iron(II) ethylhexanoate, barium(II) ethylhexanoate; 1,8-diazabicyclo[5.4.0]undec-7-ene (DBU), 1,5,7-triazabicyclo[4.4.0]dec-5-ene (TBD), 1,5-diazabicyclo[4.3.0]non-5-ene (DBN) and N,N,N',N'-tetramethylguanidine (TMG), N,N-dimethylaniline, N,N-diethylaniline and N,N-dimethyl-p-toluidine.

If necessary, component (E) may be dissolved in solvents (L) and/or organosilicon compounds (G).

The optionally employed component (E) may be either solid or liquid at 23° C. and 1000 hPa; preference is given to component (E) which is liquid at 23° C. and 1000 hPa.

Optionally employed component (E) preferably comprises 1,5-diazabicyclo[4.3.0]non-5-ene, 1,8-diazabicyclo-[5.4.0]-undec-7-ene, cobalt(II) (2-ethylhexanoate) or dioctyltin(IV) laurate.

If the compositions of the invention do include accelerators (E), the amounts are preferably 0.1 to 5 parts by weight, more preferably 0.1 to 1 part by weight, based in each case on 100 parts by weight of the total weight of components (A) and (B).

Component (F) employed optionally in the invention preferably comprises pigments, dyes, odorants, agents for influencing the tack, or flame retardants.

The optionally employed pigments (F) are preferably inorganic pigments such as iron oxides (yellow, black, red), chromium(III) oxide, and titanium dioxide, carbon black; effect pigments for generating a metallic effect, such as flakes of gold, silver, copper, aluminum, silicon, mica, optionally coated for example with $FeTiO_3$, $Fe_2O_3$, $TiO_2$, mirror fragments, or liquid-crystal pigments for generating a goniochromatic color effect. The pigments (F) may be used in powder form or in dispersion in a suitable liquid, such as organosilicon compound (G) and/or solvent (L), for example. Furthermore, the pigments (F) may be used in the form of a surface coating applied to the coarse-particle fillers (D1).

The optionally employed dyes (F) are preferably phthalocyanines or azocompounds.

If the compositions of the invention do include auxiliaries (F), the amounts are preferably 0.01 to 20 parts by weight, more preferably 0.1 to 10 parts by weight, based in each case on 100 parts by weight of the sum of components (A) and (B). The compositions of the invention preferably contain no auxiliaries (F).

The optionally employed organosilicon compounds (G) are preferably compounds which are different from component (A), more preferably compounds selected from silanes, substantially linear siloxanes and aliphatically saturated silicone resins.

The substantially linear siloxanes (G) and the aliphatically saturated silicone resins (G) are preferably compounds which may be formed as a byproduct in the preparation of component (A).

Component (G) preferably comprises silanes.

The optionally employed silanes (G) preferably comprise n-octyltrimethoxysilane, n-octyltriethoxysilane, (2,4,4-trimethylpentyl)trimethoxysilane, (2,4,4-trimethylpentyl)triethoxysilane, (2,4,4-trimethylpentyl)methyldimethoxysilane, (2,4,4-trimethylpentyl)methyldiethoxysilane, n-octylmethyldimethoxysilane, n-octylmethyldiethoxysilane, (cyclohexyl)trimethoxysilane, (cyclohexyl)triethoxysilane, (cyclohexyl)methyldimethoxysilan or (cyclohexyl)methyldiethoxysilane, methyltrimethoxysilane, methyltriethoxysilane, dimethyldimethoxysilane, dimethyldiethoxysilane, tetraethyl silicate, phenyltrimethoxysilane, phenyltriethoxysilane, (methacryloyloxymethyl)methyldimethoxysilane, (methacryloyloxymethyl)methyldiethoxysilane, methacryloyloxymethyltrimethoxysilane, methacryloyloxymethyltriethoxysilane, (methacryloyloxypropyl)methyldimethoxysilane, (methacryloyloxypropyl)methyldiethoxysilane, 3-methacryloyloxypropyltrimethoxysilane, 3-methacryloyloxypropyltriethoxysilane, vinyltrimethoxysilane, vinyltriethoxysilane, N-cyclohexylaminomethylmethyl-diethoxysilane, N-cyclohexylaminomethylmethyl-dimethoxysilane, N-cyclohexylaminomethyl-triethoxysilane, N-cyclohexylaminomethyl-trimethoxysilane, N-phenylaminomethyl-triethoxysilane, N-phenylaminomethyl-trimethoxysilane, N-(2-aminoethyl)-3-aminopropyl-trimethoxysilane, N-(2-aminoethyl)-3-aminopropyl-triethoxysilane, N-(2-aminoethyl)-3-aminopropyl-methyltrimethoxysilane, N-(2-aminoethyl)-3-aminopropyl-methyltriethoxysilane, N-cyclohexyl-3-aminopropyl-triethoxysilane, N-cyclohexyl-3-aminopropyl-trimethoxysilane, N-cyclohexyl-3-aminopropyl-methyltriethoxysilane, N-cyclohexyl-3-aminopropyl-methyltrimethoxysilane, 3-aminopropyl-triethoxysilane, 3-aminopropyl-trimethoxysilane, 3-aminopropyl-methyltriethoxysilan and 3-aminopropyl-methyltrimethoxysilane, 3-glycidyloxypropyltrimethoxysilane, 3-glycidyloxypropyltriethoxysilane, 3-(triethoxysilyl)propylsuccinic anhydride, bis(triethoxysilyl)ethane or bis(triethoxysilyl)ethene.

Optionally employed silanes (G) are more preferably tetraethyl silicate, methyltriethoxysilane, vinyltrimethoxysilane, vinyltriethoxysilane, bis(triethoxysilyl)ethane, bis(triethoxysilyl)ethene or 3-methacryloxypropyltrimethoxysilane.

Examples of optionally employed stabilizers (H) are ketone acetals such as 2,2-dimethoxypropane; epoxides such as epoxidized soybean oil; tertiary amines such as tris(2-methylheptyl)amine; or radical scavengers such as 4-methoxyphenol, 4-tert-butyl-1,2-dihydroxybenzene, 2,6-di-tert-butyl-4-methylphenol, 2,6-di-tert-butyl-p-cresol, 4-tert-butylpyrocatechol and phenothiazine.

If the compositions of the invention do include stabilizers (H), the amounts are preferably 0.001 to 1 part by weight, more preferably 0.005 to 0.5 part by weight, based in each case on 100 parts by weight of the sum of components (A) and (B). The compositions of the invention preferably do comprise stabilizers (H).

Examples of optionally employed solvent (L) are mono- and polyhydric alcohols such as methanol, ethanol, n-propanol, isopropanol, n-butanol, isobutanol, sec-butanol, 1,2-ethanediol, 1,2-propanediol, 1,3-propanediol, polypropylene glycol, polyethylene glycol, 1,2-butanediol, 1,3-butanediol, polybutylene glycol and glycerol; ethers such as methyl tert-butyl ether, di-tert-butyl ether and di-, tri- or tetraethylene glycol dimethyl ether; saturated hydrocarbons such as n-hexane, cyclohexane, n-heptane, n-octane and isomeric octanes such as 2-ethylhexane, 2,4,4-trimethylpentane, 2,2,4-trimethylpentane and 2-methylheptane, and also mixtures of saturated hydrocarbons having boiling ranges between 60-300° C., of the kind obtainable under the trade name Exxsol™, Hydroseal® or Shellsol®; aromatic solvents, such as benzene, toluene, styrene, o-, m- or p-xylene, solvent naphtha, dimethyl phthalate, diisobutyl phthalate, dicyclohexyl phthalate and mesitylene; aldehyde acetals such as methylal, ethylhexylal, butylal, 1,3-dioxolane and glycerol formal; carbonates such as 1,3-dioxolan-2-one, diethyl carbonate, dimethyl carbonate, dipropyl carbonate, propylene glycol carbonate, ethylene carbonate; ketones such as acetone, methyl isobutyl ketone, methyl ethyl ketone, methyl isoamyl ketone, diisobutyl ketone, acetone and cyclohexanone; esters such as ethyl acetate, n-butyl acetate, ethylene glycol diacetate, gamma-butyrolactone, 2-methoxypropyl acetate (MPA), dipropylene glycol dibenzoate and ethyl ethoxypropionate; carboxylic acids such as ethylhexylic acid, dicyclohexyl phthalate, n-octanoic acid or neodecanoic acid; amides such as N,N-dimethylformamide, N,N-dimethylacetamide, N-methyl-2-pyrrolidone and N-ethyl-2-pyrrolidone; acetonitrile; and dimethyl sulfoxide.

Preferred solvents (L) are carboxylic acids, carboxylic esters or saturated hydrocarbons, more preferably mixtures of saturated hydrocarbons having boiling ranges between 60 to 300° C. at 1000 hPa, ethylhexylic acid, n-octanoic acid, neodecanoic acid or 2-methoxypropyl acetate (MPA).

If the compositions of the invention do include solvents (L), the amounts are preferably 0.1 to 1 part by weight, more preferably 0.1 to 0.5 part by weight, based in each case on 100 parts by weight of the sum of components (A) and (B). The compositions of the invention preferably contain no solvent (L).

Examples of optionally employed modifiers (M) are vinyl polymers, such as polyvinyl acetates or polyvinyl acetate-co-vinyl laurates, which are soluble in component (B) at 25° C. and 1000 hPa, preferably.

If modifiers (M) are used, they are employed preferably in the form of a homogeneous mixture in component (B).

If the compositions of the invention do include modifier (M), the amounts are preferably 5 to 30 parts by weight, more preferably 10 to 20 parts by weight, based in each case on 100 parts by weight of the sum of components (A) and (B). The compositions of the invention preferably contain no modifiers (M).

The compositions of the invention are preferably compositions comprising
(A) organopolysiloxane resin,
(B) organic compound having at least one unit of the formula (II),
(C) initiator,
(D) filler,
optionally (E) accelerator,
optionally (F) pigment,
optionally (G) organosilicon compounds,
(H) stabilizer,
optionally (L) solvent and
optionally (M) modifier.

The compositions of the invention are more preferably compositions comprising
(A) organopolysiloxane resin,
(B) organic compound having at least one acrylate or methacrylate unit,
(C) initiator,
(D) filler,
(E) accelerator,
optionally (F) pigment,
optionally (G) organosilicon compounds,
(H) stabilizer,
optionally (L) solvent and
optionally (M) modifier.

Another preferred variant of the compositions 1 of the invention are those comprising
(A) organopolysiloxane resin,
(B) organic compound having at least one unit of the formula (II),
(C) initiator,
(D1) fillers in amounts of 70 to 99 parts by weight, based on 100 parts by weight of the composition 1,
optionally (E) accelerator,
optionally (F) pigment,
optionally (G) organosilicon compounds,
(H) stabilizer,
optionally (L) solvent and
optionally (M) modifier.

With particular preference the compositions 1 of the invention are those comprising
(A) organopolysiloxane resin,
(B) organic compound having at least one acrylate or methacrylate unit,
(C) initiator,
(D1) fillers in amounts of 80 to 95 parts by weight, based on 100 parts by weight of the composition 1, with the proviso that filler (D1) used comprises mixtures comprising fine-particle and coarse-particle fillers, the weight ratio of fine-particle to coarse-particle fillers being 5:1 to 1:5,
optionally (E) accelerator,
(F) pigment,
optionally (G) organosilicon compounds,
(H) stabilizer,
optionally (L) solvent and
optionally (M) modifier.

More particularly the compositions 1 of the invention are those comprising
(A) organopolysiloxane resin,
(B) organic compound having at least one acrylate or methacrylate unit,
(C) initiator,
(D1) fillers in amounts of 80 to 95 parts by weight, based on 100 parts by weight of the composition 1, with the proviso that filler (D1) used comprises mixtures comprising fine-particle and coarse-particle fillers, the weight ratio of fine-particle to coarse-particle fillers being 5:1 to 1:5,
(E) accelerator,
(F) pigment, optionally (G) organosilicon compounds,
(H) stabilizer,
optionally (L) solvent and
optionally (M) modifier.

Another preferred variant of the compositions 2 of the invention are those comprising
(A) organopolysiloxane resin,
(B) organic compound having at least one unit of the formula (II),
(C) initiator,
(D2) fillers in amounts of at least 40 to 90 parts by weight, based on 100 parts by weight of the composition 2, with the proviso that filler (D2) consists of a plurality of plies of fibrous woven or a plurality of plies of fibrous laid scrim,
optionally (E) accelerator,
optionally (F) pigment,
optionally (G) organosilicon compounds,
(H) stabilizer,
optionally (L) solvent and
optionally (M) modifier.

With particular preference the compositions 2 of the invention are those comprising
(A) organopolysiloxane resin,
(B) organic compound having at least one acrylate or methacrylate unit,
(C) initiator, (D2) fillers in amounts of at least 40 to 90 parts by weight, based on 100 parts by weight of the composition 2, with the proviso that filler (D2) consists of a plurality of plies of fibrous woven or a plurality of plies of fibrous laid scrim,
optionally (E) accelerator,
optionally (F) pigment,
optionally (G) organosilicon compounds,
(H) stabilizer,
optionally (L) solvent and
(M) modifier.

The compositions of the invention consist preferably to an extent of at least 95 wt %, more preferably at least 99 wt %, of components (A), (B), (C) and (D) and also optionally (E), (F), (G), (H), (L) and (M).

Apart from components (A), (B), (C) and (D) and also optionally (E), (F), (G), (H), (L) and (M) and also any typical raw-material impurities, such as, for example, catalyst residues, such as sodium chloride or potassium chloride; and also impurities in technical-grade acrylate monomers and any reaction products of the components employed that are formed during mixing and/or during storage, the compositions of the invention contain no further components.

The components used in the invention may each comprise one kind of such a component or else a mixture of at least two kinds of a respective component.

The compositions of the invention may be produced by mixing the individual components in any desired order and in a manner known to date.

A further subject of the present invention is a method for producing the compositions of the invention by mixing the individual components in any desired order.

In the method of the invention, the mixing may take place at temperatures in the range from preferably 10 to 50° C., more preferably in the range from 15 to 45° C., more particularly at temperatures from 20 to 40° C. Mixing takes place very preferably at the temperature which comes about on mixing at ambient temperature from the temperature of the raw materials plus the temperature increase resulting from the input of energy during mixing; as and when necessary, heating or cooling may be carried out.

The mixing may take place under the pressure of the surrounding atmosphere, in other words about 900 to 1100 hPa. Additionally it is possible for mixing to take place occasionally or continually under reduced pressure, such as at an absolute pressure of 30 to 500 hPa, for example, in order to remove volatile compounds and/or air.

The method of the invention may be carried out continuously, discontinuously or semicontinuously; it is preferably carried out discontinuously.

In one preferred embodiment of the method (V1) of the invention for producing the compositions 1, the individual components are mixed in any desired order, and filler (D1) is used as component (D).

In one variant of the method of the invention (V1), preferably components (A), (B) and (C) and also the optional components (E), (F), (G), (H), (L) and (M) in any desired order are mixed to give a premix and then filler (D1) is added; in the case of a filler mixture (D1) with different particle sizes, the premix is more preferably first mixed with the coarse-particle fraction of filler (D1), after which the fine-particle fraction of filler (D1) is added.

The premixes produced in the invention and composed of the components (A), (B) and (C) and also the optional components (E), (F), (G), (H), (L) and (M) have a dynamic viscosity of preferably 10 to 5000 mPa·s, more preferably of 50 to 3000 mPa·s, more particularly of 100 to 1000 mPa·s, in each case at 23° C.

In another variant of the method of the invention (V1), preferably components (A) and (B) and also the optional components (E), (F), (G), (H), (L) and (M) and also filler (D1) are mixed in any desired order to give a further premix; in the case of a filler mixture (D1) with different particle sizes, this premix is more preferably prepared by first incorporating the coarse-particle fraction of filler (D1) and subsequently adding the fine-particle fraction of filler (D1), and the resultant premix, lastly, is mixed with initiator (C).

In one especially preferred embodiment of the method of the invention (V1), first of all the coarse-particle fillers (D1) are premixed optionally with pigments (F), after which this premix is admixed with a mixture of components (A), (B), (C) and also the optional components (H), (E), (G), (L) and (M) and mixing is carried out, and subsequently fine-particle fillers (D1) are added to this mixture and mixed in.

In another preferred embodiment of the method of the invention (V2), for producing the compositions 2, the individual components are mixed in any desired order, and component (D2) is used as filler (D).

In a variant of the method of the invention (V2), preferably first of all components (A), (B) and (C) and also the optional components (E), (F), (G), (H), (L) and (M) are mixed in any desired order to give a premix, and then component (D2), preferably woven, laid scrim, knit or braid, is impregnated with the premix and optionally degassed. In the case of multi-ply wovens or laid scrims (D2), each layer may be impregnated and degassed individually, or all of the layers together may be impregnated and degassed.

In a further variant of the method of the invention (V2), preferably first of all components (A), (B) and (C) and also the optional components (E), (F), (G), (H), (L) and (M) are mixed in any desired order to give a premix, and this premix is then injected into a molding cavity containing component (D2), preferably woven, laid scrim, knit or braid.

The compositions of the invention may be brought into any desired shape by mechanical pressure at the temperature of the surroundings or optionally at elevated temperature.

In one preferred embodiment, the compositions 1 of the invention are kneadable mixtures of very high viscosity at room temperature and of puttylike consistency, which, however, can be made to flow under appropriately high mechanical pressure.

In another preferred embodiment, the compositions of the invention 1 have the consistency of wet sand. They are kneadable, moldable, conveyable, on conveyor belts, for example, and have a shelf life which is sufficient prior to further processing.

The compositions 2 of the invention are preferably moldable and more preferably are modeled and cured in a molding cavity or around a shaped article.

The materials of the invention or materials produced in the invention crosslink through radical polymerization and also, optionally, additionally through condensation reaction with elimination of alcohol and optionally water. If the curing according to the invention takes place additionally by condensation reaction as well, the optionally present silanol and/or organyloxy groups of resin (A) and also of the remaining components, and also any atmospheric moisture or humidity which may adhere to the components, preferably react with one another, with the proviso that the condensation reaction may be preceded by a hydrolysis step.

Prior to curing, the mixtures of the invention or mixtures produced in the invention are preferably degassed; the degassing step occurs advantageously in the course of compacting, and the mixtures more preferably are subsequently charged with inert gas having an oxygen content of below 5 wt %, more particularly of below 1 wt %.

The crosslinking according to the invention preferably takes place at temperatures in the range from 50 to 200° C., more preferably from 70 to 160° C., more particularly from 80 to 130° C.

Furthermore, the crosslinking of the compositions of the invention may take place preferably by direct and/or indirect contact with heated surfaces or in heated circulating air, more preferably in such a way as to avoid as far as possible the ingress of oxygen, from the surrounding air, for example, during crosslinking. For this purpose, the compositions of the invention may be crosslinked by direct contact of the shaped-article surface with heated surfaces, e.g., in closed chambers, and/or by covering the shaped-article surfaces with a suitable, air-impermeable sheet, and/or by introducing the compositions of the invention into a molding cavity and subsequently heating indirectly, i.e., together with the sheet and/or the mold cavity, using heated surfaces or hot circulating air.

Crosslinking may be accelerated by an increase in the temperature, and accordingly the shaping and the crosslinking may also be carried out in one common step.

The crosslinking according to the invention preferably takes place under the pressure of the surrounding atmosphere, in other words at about 900 to 1100 hPa, but may also take place under elevated pressure, in other words at from 1200 hPa to 10 MPa.

The compositions of the invention may be employed for all purposes for which prepolymers of thermosets have also been employed to date. The mixtures of the invention are processed by known methods.

A further subject of the present invention are shaped articles produced by crosslinking the compositions of the invention.

Shaped articles may be produced from the mixtures of the invention, for example, by the long-known method of injection molding. For that purpose the mixture is injected by means of mechanical pressure into a corresponding molding cavity. The mold is generally of two-part form and is closed by a hydraulic press during the injection molding operation. The mold is preheated to the desired temperature, on the one hand facilitating the flow of the material and on the other hand accelerating the curing. After the end of the injection molding procedure, the mold is kept closed until the shaped articles have attained a consistency which allows them to be withdrawn without being destroyed. Molding cavities for test articles are described for example in DIN EN ISO 10724-1:2002-04.

The shaped articles of the invention which are obtained by crosslinking the compositions 1 (shaped articles 1) preferably have a flexural strength of at least 20 MPa, more preferably at least 25 MPa, yet more preferably of at least 30 MPa, and most preferably at least 35 MPa, in each case at 23° C. The shaped articles 1 of the invention with a weight ratio of fine-particle to coarse-particle fillers of 3:1 to 1:3 preferably have a flexural strength at 23° C. of at least 30 MPa, more preferably at least 35 MPa at 70° C.

The shaped articles 1 of the invention are preferably artificial stones.

A further subject of the present invention is a method for producing artificial stones, characterized in that the compositions 1 of the invention are shaped and crosslinked.

To produce artificial stones, the materials of the invention are first placed into a mold, and reduced pressure is subsequently applied in order to prevent gas inclusions. Densification may take place in this step itself, preferably by setting the material of the invention into vibration by way of the molds. This is followed by further densification of the material through application of mechanical pressure. This compacting procedure, i.e., the densification optionally under vibration at a pressure of less than 50 mPa, lasts preferably 1 to 3 minutes. If the shaped article is being cured in the mold, then the mold, simultaneously with one of the preceding steps or subsequently, is heated for a period of preferably 15 to 120 minutes at temperatures above room temperature, preferably at 50 to 200° C., more preferably at 70 to 160° C., most preferably at 80 to 130° C. Thereafter the shaped article is withdrawn from the mold. An alternative possibility, which is particularly preferred, is to withdraw the as yet not fully cured shaped article from the mold after the end of shaping, i.e., after the mechanical pressing, and to cure it fully in a subsequent separate step in a separate apparatus with the times and temperatures stated above. Advantageously thereafter, independently of the curing method, there is further storage at ambient temperature for a duration of at least an hour. The resultant shaped article can then be processed further by known methods, such as by grinding, surface polishing and trimming, for example.

The artificial stones of the invention preferably have a hardness of at least 75 Shore D, more preferably of at least 80 Shore D, and most preferably at least 85 Shore D, in each case at 23° C.

The shaped articles 2 of the invention are preferably fiber composite materials.

A further subject of the invention is a method for producing fiber composite materials, characterized in that the compositions 2 of the invention are shaped and crosslinked.

The compositions of the invention have the advantage that they are storage-stable and exhibit a consistency which can be adapted in line with the requirements.

The compositions of the invention have the advantage that they can be produced from readily available raw materials and in a simple way.

The compositions of the invention have the advantage, furthermore, that they cure quickly to form a solid composite.

The compositions of the invention have the advantage, in particular, that in a temperature range from 18 to 25° C. they exhibit a good working time of preferably more than 30 minutes, more preferably more than 45 minutes, most preferably more than 60 minutes, and yet at elevated temperature, preferably at 80 to 130° C., they cure rapidly, and the hardness and flexural strength of the resultant shaped articles are such, even after preferably one hour, that further processing (cutting, grinding, polishing) is possible.

The shaped articles of the invention do not exhibit any color change (yellowing of light hues or lightening of dark hues) on exposure to UV radiation, in comparison to conventional shaped articles based on organic resins, when significant alterations are already visible in the case of the conventional systems, examples being polyester resins which are in solution in styrene.

The shaped articles of the invention have the advantage that they are stable to weathering and to heat and have a reduced fire load in comparison to composite materials with purely organic binders.

Furthermore, the compositions of the invention have the advantage that they are outstandingly suitable for producing artificial stone.

The compositions of the invention have the advantage that on processing they do not give rise to harmful emissions to the extent of those commonly occurring in the case of polyester resins which are used according to the prior art and are present in solution in styrene.

The compositions of the invention have the advantage that it is possible to produce composites exhibiting high flexural strength and high hardnesses at the same time.

The compositions of the invention have the advantage that it is possible to produce composites which exhibit high flexural strengths and high hardnesses at the same time even at relatively high temperatures, of 70° C., for example.

In the examples below, all data for parts and percentages, unless otherwise indicated, are based on the weight. Unless otherwise indicated, the following examples are carried out at a pressure of the surrounding atmosphere, in other words at about 1000 hPa, and at room temperature, in other words at about 20° C. or at a temperature which comes about when the reactants are combined at room temperature without additional heating or cooling. All dynamic viscosity data recited in the examples are intended to relate to a temperature of 23° C.

Measurement of Flexural Strength

In the present invention, the flexural strength was measured according to ISO 178:2011-04 Method A with a test velocity of 2 mm/min at a support distance of 60 mm. The procedure here was preferably as follows: test specimens in dimensions of length×width×thickness=80 mm×10 mm×4 mm were used. The measurements were carried out on five test specimens in each case. The test specimens were produced by injection molding methods using a mold having exchangeable molding cavity plates in accordance with DIN EN ISO 10724-1:2002-04 as indicated in Example 1 and were cured under the conditions (temperature, time) specified in Example 1. During testing, the sample specimens were always inserted into the machine in the same way as they were positioned in the injection mold, i.e., with the bottom side downward. The value reported in Table 1 for the flexural strength in MPa corresponds to the respective mean value of the individual measurements, rounded to whole numbers in accordance with DIN 1333:1992-02 Section 4.

Measurement of Shore D Hardness

The Shore D hardness was determined according to DIN EN ISO 868:2003-10. The measurement was carried out using a Shore D durometer on plate sample specimens in dimensions of length×width×thickness=40 mm×40 mm×6 mm, these specimens having been produced by injection molding methods with a mold having exchangeable molding cavity plates in accordance with DIN EN ISO 10724-1:2002-04 Form 2 as described in Example 1 and cured under the conditions (temperature, time) specified in Example 1. The Shore D hardness was measured on both the top and bottom sides of three test specimens in each case, giving a total of six measurement values. The value reported in Table 1 corresponds to the mean value from the individual measurements.

In the Text Below

Me is methyl radical, Vi is vinyl radical, Et is ethyl radical, Ph is phenyl radical, Ma is 3-methacryloyloxypropyl radical and Io is 2,4,4-trimethylpentyl radical.

Resin Mixture 1

In a heatable glass reactor with KPG stirrer, 2080 g of technical methyltrimethoxysilane (available commercially as Silan M1-trimethoxy from Wacker Chemie AG, Munich, Germany), 568 g of vinyltrimethoxysilane (available commercially as Silan V-trimethoxy from Wacker Chemie A G, Munich, Germany) and 48 g of hexamethyldisiloxane (available commercially as Öl AK 0,65 from Wacker Chemie AG, Munich, Germany) are heated to 50° C. and over the course of 10 minutes a mixture of 368 g of water and 4.00 g of hydrochloric acid (20% in water, 21.9 mmol hydrogen chloride, available commercially as Salzsaure 20% zur Analyse from Bernd Kraft GmbH, Duisburg, Germany) is added and the resulting mixture is stirred at reflux for an hour. Then 116 g of water are added and the mixture is stirred at reflux for two hours. Subsequently, over the course of 10 minutes, neutralization is carried out with 4.56 g of sodium methoxide solution (25% in methanol, 21.1 mmol sodium methoxide, available commercially from SIGMA-ALDRICH Chemie GmbH, Taufkirchen, Germany).

The product obtained is devolatilized to 100° C. and 50 mbar. 1590 g of a resin having the following composition $(MeSiO_{3/2})_{0.48}(ViSiO_{3/2})_{0.12}(Me(MeO)SiO_{2/2})_{0.26}(Vi(MeO)SiO_{2/2})_{0.07}(Me(HO)SiO_{2/2})_{0.02}(Me_2SiO_{2/2})_{0.01}(Me(MeO)_2SiO_{1/2})_{0.01}(Me_3SiO_{1/2})_{0.03}$ with a number-average molar mass Mn of 1860 g/mol and weight-average molar mass Mw of 4860 g/mol are obtained, and this resin is mixed with 360 g of butyl methacrylate (available commercially as methacrylic acid butyl ester from SIGMA-ALDRICH Chemie GmbH, Taufkirchen, Germany). This gives 1950 g of a cloudy mixture having a dynamic viscosity of 110 mPa·s.

Resin Mixture 2

The approach to producing the resin mixture 1 is repeated, with the difference that the silicone resin obtained is mixed not with 360 g of n-butyl methacrylate but with 160 g of n-butyl methacrylate and 200 g of 2-hydroxyethyl methacrylate (available commercially as methacrylic acid 2-hydroxyethyl ester from SIGMA-ALDRICH Chemie GmbH, Taufkirchen, Germany). This gives 1950 g of a cloudy mixture having a dynamic viscosity of 260 mPa·s.

Resin Mixture 3

The approach to producing the resin mixture 1 is repeated, with the difference that the silicone resin obtained is mixed not with 360 g of n-butyl methacrylate but with 160 g of 2-hydroxyethyl methacrylate and 200 g of 1,6-hexanediol dimethacrylate (available commercially from SIGMA-ALDRICH Chemie GmbH, Taufkirchen, Germany).

This gives 1950 g of a cloudy mixture having a dynamic viscosity of 290 mPa·s.

Resin Mixture 4

The approach to producing the resin mixture 1 is repeated, with the difference that the silicone resin obtained is mixed not with 360 g of butyl methacrylate but with 160 g of 2-hydroxyethyl methacrylate and 200 g of 1,9-nonanediol diacrylate (available commercially as 1,9-nonanediol diacrylate from abcr GmbH, Karlsruhe, Germany).

This gives 1950 g of a cloudy mixture having a dynamic viscosity of 310 mPa·s.

Resin Mixture 5

The approach to producing the resin mixture 1 is repeated, with the difference that the silicone resin obtained is mixed not with 360 g of butyl methacrylate but with 280 g of poly(propylene glycol) dimethacrylate, number-average molar mass Mn ~560 (available commercially from SIGMA-ALDRICH Chemie GmbH, Taufkirchen, Germany).

This gives 1950 g of a cloudy mixture having a dynamic viscosity of 520 mPa·s.

Resin Mixture 6

In a heatable glass reactor with KPG stirrer, 2080 g of technical methyltrimethoxysilane, 952 g of 3-methacryloyloxypropyltrimethoxysilane (available commercially as GENIOSIL® GF 31 from Wacker Chemie AG, Munich, Germany), and 48 g of hexamethyldisiloxane are heated to 50° C. and over the course of 10 minutes a mixture of 368 g of water and 4.00 g of hydrochloric acid (20% in water, 21.9 mmol hydrogen chloride) is added and the resulting mixture is stirred at reflux for an hour. Then 104 g of water are added and the mixture is stirred at reflux for two hours. Subsequently, over the course of 10 minutes, neutralization is carried out with 4.56 g of sodium methoxide solution (25% in methanol, 21.1 mmol sodium methoxide).

The product obtained is devolatilized to 100° C. and 50 mbar. 1960 g of a resin having the following composition $(MeSiO_{3/2})_{0.44}(MaSiO_{3/2})_{0.11}(Me(MeO)SiO_{2/2})_{0.28}(Ma(MeO)SiO_{2/2})_{0.07}(Me(HO)SiO_{2/2})_{0.02}(Ma(HO)SiO_{2/2})_{0.01}(Me_2SiO_{2/2})_{0.01}(Me(MeO)_2SiO_{1/2})_{0.03}(Me_3SiO_{1/2})_{0.03}$ with a number-average molar mass Mn of 1710 g/mol and a weight-average molar mass Mw of 4700 g/mol are obtained, and this resin is mixed with 450 g of n-butyl methacrylate. This gives 2410 g of a cloudy mixture having a dynamic viscosity of 220 mPa·s.

Example 1

17 g of resin mixture 1 are combined with 35 g of fine-particle quartz flour with a dry sieving residue, at a mesh size of 40 μm, of 2 wt % (available commercially under the name Quarzmehl 16.900 from Amberger Kaolinwerke Eduard Kick GmbH & Co. KG, Hirschau, Germany) and these ingredients are mixed in a Speedmixer™ DAC 150 FVZ from Hauschild & Co. KG for 30 seconds at 2500 revolutions/min, after which the mixture is admixed with 70 g of course-particle quartz granules having a mean grading of 0.3 to 0.9 mm (available commercially as SB0,3-0,9T from Amberger Kaolinwerke Eduard Kick GmbH, Hirschau, Germany) and mixing continues in the Speedmixer™ DAC 150 FVZ for 30 seconds at 2500 revolutions/min, during which the temperature of the mixture increases to 40° C. Lastly. 0.1 g of tert-butylperoxybenzoate is incorporated in the Speedmixer™ DAC 150 FVZ for 30 seconds at 2500 revolutions/min, after which the mixture is briefly stirred manually with a spatula and then again mixed in the Speedmixer™ DAC 150 FVZ for 30 seconds at 1500 revolutions/min; the temperature of the mixture is 52° C.

The test specimens are produced using an oil-hydraulic press of type VSKO 75 from Lauffer GmbH & Co. KG. The press is fitted with a mold having exchangeable molding cavity plates according to DIN EN ISO 10724-1:2002-04, which enable production of test specimens in dimensions of length×width×thickness=80 mm×10 mm×4 mm (for testing flexural strength) or length×width×thickness=40 mm×40 mm×6 mm (for testing hardness). The mold is closed hydraulically with a closing force of 140 kN. The external dimensions of the mold in terms of length×width=450 mm×450 mm. The pressing ram has a diameter of 50 mm. To produce the test specimens, 100 g of the above-described mixture are introduced and injected with a pressing force of 5 kN into the respective molding cavity, which is preheated at a temperature of 120° C. When the molding cavities are fully filled, the pressing force increases to 25 kN. At this point the hydraulic system is shut off. In the course of curing, the force slowly subsides, and amounts to 14 kN at the end of the overall pressing and curing process. After 30 minutes at 120° C., the mold is opened and the test specimens are withdrawn. The resulting test specimens are stored for 24 h at 23° C. and 50% relative humidity and subsequently their properties are examined at the temperatures stated in Table 1a. The results are found in Table 1a.

Example 2

The procedure described in Example 1 is repeated, with the modification that resin mixture 2 is used in place of resin mixture 1.

The resulting test specimens are stored for 24 h at 23° C. and 50% relative humidity and subsequently their properties are examined at the temperatures stated in Table 1a. The results are found in Table 1a.

Example 3

The procedure described in Example 1 is repeated, with the modification that resin mixture 3 is used in place of resin mixture 1.

The resulting test specimens are stored for 24 h at 23° C. and 50% relative humidity and subsequently their properties are examined at the temperatures stated in Table 1a. The results are found in Table 1a.

Example 4

The procedure described in Example 1 is repeated, with the modification that resin mixture 4 is used in place of resin mixture 1.

The resulting test specimens are stored for 24 h at 23° C. and 50% relative humidity and subsequently their properties are examined at the temperatures stated in Table 1a. The results are found in Table 1a.

Example 5

The procedure described in Example 1 is repeated, with the modification that resin mixture 5 is used in place of resin mixture 1.

The resulting test specimens are stored for 24 h at 23° C. and 50% relative humidity and subsequently their properties are examined at the temperatures stated in Table 1a. The results are found in Table 1a.

Example 6

The procedure described in Example 1 is repeated, with the modification that resin mixture 6 is used in place of resin mixture 1.

The resulting test specimens are stored for 24 h at 23° C. and 50% relative humidity and subsequently their properties are examined at the temperatures stated in Table 1a. The results are found in Table 1a.

Example 7

25 g of resin mixture 6 are combined with 75 g of fine-particle quartz flour with a dry sieving residue according to DIN EN 933-10, at a mesh size of 40 μm, of 2 wt % (available commercially under the name Quarzmehl 16.900 from Amberger Kaolinwerke Eduard Kick GmbH & Co. KG, Hirschau, Germany) and these ingredients are mixed in a Speedmixer™ DAC 150 FVZ from Hauschild & Co. KG for 30 seconds at 2500 revolutions/min, during which the temperature of the mixture increases to 39° C. Lastly. 0.5 g of tert-butylperoxybenzoate is incorporated in the Speedmixer™ DAC 150 FVZ for 30 seconds at 2500 revolutions/min, after which the mixture is briefly stirred manually with a spatula and then again mixed in the Speedmixer™ DAC 150 FVZ for 30 seconds at 1500 revolutions/min; the temperature of the mixture is 48° C.

The further processing of the mixture takes place as described in Example 1, with the change that after 30 minutes at 140° C. the mold is opened and the test specimens are withdrawn.

The resulting test specimens are stored for 24 h at 23° C. and 50% relative humidity and subsequently their properties are examined at the temperatures stated in Table 1a. The results are found in Table 1a.

Comparative Example C1

The procedure described in Example 1 is repeated, with the modification that instead of resin mixture 1, a mixture consisting of 13.6 g of a silicone having the average composition $(Me_2SiO_{2/2})_{0.71}(ViMeSiO_{2/2})_{0.15}(Me_2Si(OH)O_{1/2})_{0.10}(ViMeSi(OH)O_{1/2})_{0.04}$, a dynamic viscosity of 40 mPa·s, a number-average molar mass Mn of 1050 g/mol and a weight-average molar mass Mw of 1210 g/mol and 3.4 g of butyl methacrylate is used.

The resulting test specimens are stored for 24 h at 23° C. and 50% relative humidity and subsequently their properties are examined at the temperatures stated in Table 1b. The results are found in Table 1b.

Comparative Example C2

The procedure described in Example 1 was repeated, with the modification that instead of resin mixture 1, a silicone resin having the composition $(MeSiO_{3/2})_{0.46}(ViSiO_{3/2})_{0.11}(Me(MeO)SiO_{2/2})_{0.28}(Vi(MeO)SiO_{2/2})_{0.08}(Me(HO)SiO_{2/2})_{0.02}(Me_2SiO_{2/2})_{0.01}(Me(MeO)_2SiO_{1/2})_{0.01}(Me_3SiO_{1/2})_{0.03}$ with a number-average molar mass Mn of 1720 g/mol, a weight-average molar mass Mw of 3940 g/mol and a viscosity of 2870 mPa·s was used.

The resulting test specimens are stored for 24 h at 23° C. and 50% relative humidity and subsequently their properties are examined at the temperatures stated in Table 1b. The results are found in Table 1b.

Comparative Example C3

The procedure described in Example 1 is repeated, with the modification that instead of 17 g of the resin mixture 1, a mixture of 13.6 g of 2,4,6,8-tetramethyl-2,4,6,8-tetravinylcyclotetrasiloxane (CAS: 2554-06-5) and 3.4 g of n-butyl methacrylate was used, and instead of 0.5 g of tert-butyl peroxybenzoate, 1.0 g of tert-butyl peroxybenzoate was used.

The resulting test specimens are stored for 24 h at 23° C. and 50% relative humidity and subsequently their properties are examined at the temperatures stated in Table 1b. The results are found in Table 1b.

TABLE 1A

| | Example | | | | | | |
|---|---|---|---|---|---|---|---|
| | 1 | 2 | 3 | 4 | 5 | 6 | 7 |
| Hardness (Shore D) at 23° C. | 88 | 86 | 87 | 86 | 90 | 91 | 91 |
| Flexural strength [MPa] at 23° C. | 36 | 34 | 31 | 33 | 35 | 39 | 53 |

TABLE 1b

| | Example | | |
|---|---|---|---|
| | C1 | C2 | C3 |
| Hardness (Shore D) at 23° C. | 20 | 74 | 80 |
| Flexural strength [MPa] at 23° C. | * | 13 | 8 |

* Test specimens were very soft, and so no flexural strength could be measured.

The invention claimed is:

1. A composition, comprising:
   (A) at least one organopolysiloxane resin consisting of units of the formula $$R_a R^1_b (OR^2)_c SiO_{(4-a-b-c)/2} \quad (I),$$

where
   R are identical or different and are hydrogen or monovalent, SiC-bonded, optionally substituted hydrocarbon radicals free of aliphatic carbon-carbon multiple bonds,
   $R^1$ are identical or different and are monovalent, SiC-bonded, optionally substituted hydrocarbon radicals which have one or more aliphatic carbon-carbon multiple bonds,
   $R^2$ are identical or different and denotes hydrogen or monovalent, optionally substituted hydrocarbon radicals,
   a is 0, 1, 2 or 3,
   b is 0 or 1 and
   c is 0, 1, 2 or 3,
   with the proviso that in formula (I) the sum a+b+c≤3, in at least one unit of the formula (I) b=1, in at least 50% of the units of the formula (I) a+b=1 and also in at most 10% of the units of the formula (I) a+b=3, based in each case on all siloxane units of the formula (I) in organopolysiloxane resin (A),
   (B) organic compounds having at least one unit of the formula $$CR^3_2{=}CR^3{-}CO{-}Z{-} \quad (II),$$

where
   $R^3$ are identical or different and are hydrogen, a cyano radical —CN, or a monovalent, optionally substituted hydrocarbon radical optionally interrupted by heteroatoms,
   Z are identical or different and are —O— or —NR⁵—
   where
   $R^5$ are identical or different and are hydrogen or a monovalent, optionally substituted hydrocarbon radical optionally interrupted by heteroatoms,
   (C) initiators, and
   (D) fillers.

2. The composition of claim 1, wherein resin (A) consists of on average at least 12 units of the formula (I).

3. The composition of claim 1, wherein component (B) is present in an amount of 1 to 250 parts by weight, based on 100 parts by weight of component (A).

4. The composition of claim 2, wherein component (B) is present in an amount of 1 to 250 parts by weight, based on 100 parts by weight of component (A).

5. The composition of claim 1, wherein compound(s) (B) have a boiling point of at least 120° C. at a pressure of 1000 hPa.

6. The composition of claim 1, wherein component (D) contains a component selected from the group consisting of particulate fillers, fibers up to a length of 5 cm (D1), semifinished fiber products comprising fibers having a length of more than 5 cm (D2) and mixtures thereof.

7. The composition of claim 6, wherein one component (D1) comprises a mixture of fine-particle fillers and coarse-particle fillers.

8. The composition of claim 6, wherein fillers (D1) are present in amounts of in total 70 to 99 parts by weight, based on 100 parts by weight of the composition.

9. The composition of claim 6, wherein component (D2) is a woven, laid scrim, knit, braid, mat or nonwoven, or mixture thereof.

10. A method for producing a composition of claim 1, comprising mixing the individual components in any order.

11. A shaped article produced by crosslinking a composition of claim 1.

12. A method for producing artificial stone, comprising shaping and crosslinking a composition of claim 1.

13. A method for producing a fiber composite material, comprising shaping and crosslinking a composition of claim 9.

14. The composition of claim 1, wherein organopolysiloxane resin (A) contains not more than 50 units of the formula (I).

15. A composition, comprising:
(A) at least one organopolysiloxane resin consisting of units of the formula $$R_aR^1_b(OR^2)_cSiO_{(4-a-b-c)/2} \quad (I),$$

where

R are identical or different and are hydrogen or monovalent, SiC-bonded, optionally substituted hydrocarbon radicals free of aliphatic carbon-carbon multiple bonds, $R^1$ are identical or different and are monovalent, SiC-bonded, optionally substituted hydrocarbon radicals which have one or more aliphatic carbon-carbon multiple bonds, $R^2$ are identical or different and denotes hydrogen or monovalent, optionally substituted hydrocarbon radicals, a is 0, 1, 2 or 3,
b is 0 or 1 and
c is 0, 1, 2 or 3, with the proviso that in formula (I) the sum $a+b+c\leq 3$, in at least one unit of the formula (I) b=1, in at least 50% of the units of the formula (I) a+b=1 and also in at most 10% of the units of the formula (I) a+b=3, based in each case on all siloxane units of the formula (I) in organopolysiloxane resin (A), and are liquid at 25° C. with a viscosity of from 1000 mPa·s to 100,000 mPa·s, (B) organic compounds having at least one unit of the formula $$CR^3_2=CR^3-CO-Z- \quad (II),$$

where $R^3$ are identical or different and are hydrogen, a cyano radical —CN, or a monovalent, optionally substituted hydrocarbon radical optionally interrupted by heteroatoms, Z are identical or different and are —O— or —NR$^5$— where $R^5$ are identical or different and are hydrogen or a monovalent, optionally substituted hydrocarbon radical optionally interrupted by heteroatoms, (C) initiators, and
(D) fillers.

16. The composition of claim 1, further optionally containing (E) accelerators; (F) auxiliaries selected from the group consisting of pigments, dyes, odorants, agent which influence tack, flame retardants, and mixtures thereof; (G) further organosilicon compounds different from (A); (H) stabilizers; (L) organic solvents; and (M) polymeric modifiers.

17. The composition of claim 16, which contains no substances other than components (A) through (H), (L), and (M).

18. The composition of claim 1, wherein organopolysiloxane resin (A) is a low viscosity liquid having a viscosity of from 1000 mPa·s to 100,000 mPa·s at 25° C.

19. A composition, comprising:
(A) at least one organopolysiloxane resin consisting of units of the formula $$R_aR^1_b(OR^2)_cSiO_{(4-a-b-c)/2} \quad (I),$$

where

R are identical or different and are hydrogen or monovalent, SiC-bonded, optionally substituted hydrocarbon radicals free of aliphatic carbon-carbon multiple bonds, $R^1$ are identical or different and are monovalent, SiC-bonded, optionally substituted hydrocarbon radicals which have one or more aliphatic carbon-carbon multiple bonds, $R^2$ are identical or different and denotes hydrogen or monovalent, optionally substituted hydrocarbon radicals, a is 0, 1, 2 or 3,
b is 0 or 1 and
c is 0, 1, 2 or 3, with the proviso that in formula (I) the sum $a+b+c\leq 3$, in at least one unit of the formula (I) b=1, in at least 50% of the units of the formula (I) a+b=1 and also in at most 10% of the units of the formula (I) a+b=3, based in each case on all siloxane units of the formula (I) in organopolysiloxane resin (A), (B) organic compounds having at least one unit of the formula $$CR^3_2=CR^3-CO-Z- \quad (II),$$

where $R^3$ are identical or different and are hydrogen, a cyano radical —CN, or a monovalent, optionally substituted hydrocarbon radical optionally interrupted by heteroatoms, Z are identical or different and are —O— or —NR$^5$— where $R^5$ are identical or different and are hydrogen or a monovalent, optionally substituted hydrocarbon radical optionally interrupted by heteroatoms, (C) initiators, and
(D) fillers, wherein the fillers (D) are present in an amount of 80 to 99 weight percent based on the total weight of the composition.

* * * * *